United States Patent [19]

Wondrasch et al.

[11] Patent Number: 4,781,732
[45] Date of Patent: Nov. 1, 1988

[54] METHOD FOR CLEANING CRUDE GAS AND APPARATUS THEREFORE

[75] Inventors: Otmar Wondrasch, Vienna; Jorg Schrittwieser; Robert Koch, both of Stockerau, all of Austria

[73] Assignee: Isover Saint-Gobain, Aubervilliers, France

[21] Appl. No.: 922,841

[22] Filed: Oct. 24, 1986

[30] Foreign Application Priority Data

Oct. 24, 1985 [AT] Austria ................... 3078/85

[51] Int. Cl.⁴ .............................................. B03C 1/00
[52] U.S. Cl. ........................................... 55/10; 55/89; 55/94; 55/122; 435/266; 435/313
[58] Field of Search ............... 55/10, 84, 85, 89, 93, 55/94, 13, 118, 122, 228; 435/287, 266, 313, 314, 315, 819; 210/916

[56] References Cited

U.S. PATENT DOCUMENTS

| | | | |
|---|---|---|---|
| 2,200,581 | 5/1940 | Pruss et al. | 435/266 |
| 2,598,116 | 5/1952 | Du Bois | 55/94 |
| 3,958,961 | 5/1976 | Bakke | 55/122 |
| 4,256,468 | 3/1981 | Mazer et al. | 55/85 |

FOREIGN PATENT DOCUMENTS

| | | | |
|---|---|---|---|
| 55-61946 | 5/1980 | Japan | 55/10 |
| 1248393 | 9/1971 | United Kingdom | 55/89 |
| 1597966 | 9/1981 | United Kingdom | 55/84 |

*Primary Examiner*—Bernard Nozick
*Attorney, Agent, or Firm*—Oblon, Fisher, Spivak, McClelland & Maier

[57] ABSTRACT

A method of and an apparatus for cleaning crude gas, particularly waste gas from a mineral fibre production plant and contaminated with phenol and/or formaldehyde and/or the products of condensation thereof, wherein the crude gas is sprayed with a circulated washing liquid enriched with micro-organisms, some of the impurities contained in the crude gas being in this way agglutinated, the washing liquid being collected in a storage tank and the impurities contained therein being at least partly degraded by the micro-organisms which are themselves subjected to an activation process, and wherein, after it leaves the spraying tower, the crude gas sprayed with the washing liquid is passed through the electric high-voltage field of a wet film precipitator in which the aerosols are separated and fed to the storage tank or collecting tank. The cleaned gas has substantially lower emission levels than previously and is odorless and colorless.

3 Claims, 1 Drawing Sheet

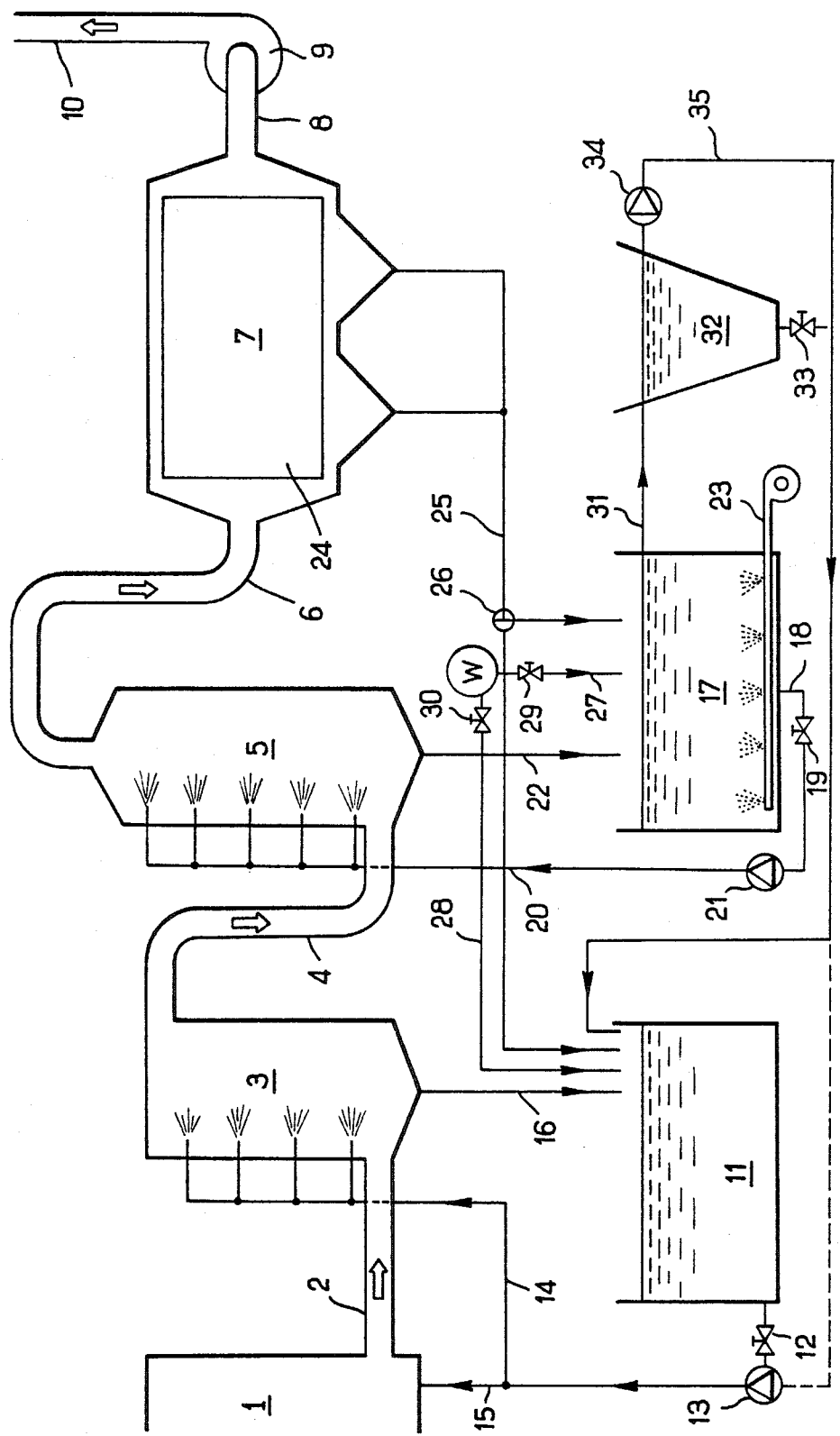

METHOD FOR CLEANING CRUDE GAS AND APPARATUS THEREFORE

BACKGROUND OF THE INVENTION

1. Field of the Invention

The invention relates to a method of cleaning crude gas, particularly waste gas from a mineral fibre production plant and contaminated with phenol and/or fomaldehyde and/or the condensation products thereof, and wherein the crude gas is sprayed with a circulated washing liquid enriched with micro-organisms, some of the impurities contained in the crude gas being in this way agglutinated, the washing liquid being collected and the impurities contained therein being at least partly degraded by the micro-organisms, the micro-organism being themselves subjected to an activation process.

Furthermore, the invention relates to an apparatus for carrying out the method, comprising a filter plant and a storage tank for the micro-organism enriched washing liquid, the storage tank being connected by a pipe and pump to the filter plant which discharges into the storage tank.

2. Background of the Prior Art

In the case of many production plants, e.g. in foundries or in plants which are of particular interest and which are for producing glass and mineral fibres as well as felts, fleeces or the like from these fibres, contaminated crude gas arises which must be cleaned before it can be passed out into the atmosphere.

The crude gas is first and foremost contaminated by phenol both in free and also in broken down form and formaldehyde together with phenol formaldehyde resin, which substances originate from the binding agents used in the production of the mineral fibre products. Furthermore, the crude gas contains odorous substances which smell unpleasant to humans and unpleasant and changing colourings.

The way in which emissions of such a production plant can be ascertained and restricted can be determined from VDI Guidelines 3457.

The limit emission values according to these Guidelines amount for water vapour volatile phenols and formaldehyde to 20 mg/cu·m in the case of annealing purposes and cooling apparatus and 40 mg/cu·m in the case of fibre manufacture.

A known method of cleaning crude gas resides in passing the gas through a washing and deposition chamber and subsequently through a wet precipitator, the washing water being recycled. When the crude gas is sprayed with washing water, aerosols form in which a major part of the organic impurities is absorbed and separated off in the precipitator. Certainly, the washing water cannot be used unrestrictedly and must be renewed from time to time, so giving rise to the problem of washing water cleaning. A further disadvantage lies in the fact that gaseous emissions can only be inadequately separated off in the wet film precipitator; odorous substances and colouring matter continue to pass into the atmosphere. Furthermore, phenol formaldehyde resin residues stock to the plates of the wet precipitator.

On the other hand, what are known as biowashers have already been proposed for crude gas cleaning, wherein some components of the waste gas are picked up by a washing liquid which is then regenerated by micro-organisms which use the washed out gas components as nutrients. The micro-organisms together with the undissolved pollutants form what is referred to as activated sludge. Since not all microorganisms can degrade certain pollutants, a natural selection takes place in the washing process. As a rule, the activated sludge must be ventilated to feed it with oxygen; furthermore, by virtue of evaporation, a fresh water topping up arrangement is required (VDI Guidelines 3478).

However, a biowasher has the disadvantage that aerosols such as bonded phenol, are poorly separated.

SUMMARY OF THE INVENTION

The invention is based on the object of further reducing these emission levels and furthermore of filtering odorous and colouring substances out of the waste gas; however, the impurities which are separated off must be prevented from leading to any other contamination, i.e. no waste water should occur.

This object is on the one hand achieved by a method in which the crude gas which is sprayed with washing liquid is passed through an electric high-voltage field.

Spraying the crude gas with the micro-organism-enriched washing liquid washes out most of the gaseous impurities. The aerosols which pass through the spraying tower are then separated off in the high voltage field and the separated impurities are oxidized biologically by the micro-organisms.

The target set is achieved by an apparatus for practicing this process, wherein the filter system comprises a spraying tower with spray jets and preferably without any interior fittings and, downstrean of this tower, a wet film precipitator, the conduit being connected to the spray jets of the spray tower.

Since only the gaseous impurities need to be broken down in the spray tower, the spray tower can be free of any internal fittings so that pressure loss and risk of contamination are extremely low. Furthermore, this overcomes the drawback that gaseous impurities can only be inadequately separated off in wet precipitators.

A further advantage arises from the fact that the wet film precipitator has washing liquid applied to it, the microorganisms collecting like a so-called lawn on the plates of the separator. This lawn breaks down the residues of phenol formaldehyde resins which are contained as sticky impurities in the crude gas, so that the layer of resin (bakelite) which would have an insulating effect and considerably reduce the efficiency and which would otherwise build up on the plates does not form. The lawn can readily be rinsed away and fed to the storage tank for the washing liquid.

The washing liquid is biologically treated in the storage tank in that oxygen and possibly nutrients such as yeast are added to it.

A further effect of the invention lies in the fact that sudden loadings are easily accommodated by the micro-organisms. Tests have shown that by using the method or apparatus according to the invention, the emission levels can be reduced considerably below the VDI limits. Typical figures for filter action are:

Phenol: 95 to 98%
Formaldehyde: 65 to 80%

Typical clean gas concentrations are:

Phenol: 1 mg/cu·m
Formaldehyde: 4 mg/cu·m

These figures apply to a production plant turning out mineral fibre products and using a phenol formaldehyde binder.

In addition to the above-mentioned considerably reduced emission levels, the clean gas has virtually no smell and is invisible except for vapour condensations.

DETAILED DESCRIPTION OF THE INVENTION

The invention will be explained in greater detail hereinafter with reference to an example of embodiment of the apparatus which is shown diagrammatically in the accompanying drawing.

The crude gas emerging from a production plant 1 for manufacturing mineral fibre products and using urea modified phenol formaldehyde resin as a binding agent passes through a conduit 2 into a conventional pre-washer 3 in which it is subjected to a coarse pre-cleaning process. Connected to the pre-washer 3 through a conduit 4 is a spray tower 5 containing no interior rings and which comprises only spray jets so that there is only a negligible pressure loss and so that the risk of contamination is small, so that cleaning work can be carried out easily and relatively rarely. Connected to the spray tower 5 through a further conduit 6 is a wet film precipitator 7 which is operated for example on 70 kV and to the outlet 8 which is connected to a blower 9 by which the clean gas is blown out through a chimney 10 into the atmosphere.

The pre-washer 3 serves first and foremost for the separation of fibrous impurities and is operated with washing water which is taken from a collectin tank 11 through a valve 12 and passed by a pump 13 through a pipe 14 to the pre-washer 3. Part of this water can be fed to the production plant 1 through a branch pipe 15. The washing water emerging from the pre-washer 3 passes through a discharge pipe 16 into the collecting tank 11 in which it is cleaned mechanically.

To supply the spray tower 5 with washing liquid, a storage tank 17 is provided, to the outlet 18 of which a line 20 is connected via a valve 19, a pump 21 incorporated into the line 20 serving to feed the washing liquid to the spray jets of the spray tower 5. The discharge 22 from the spray tower 5 empties into the storage tank 17.

Contained in the storage tank 17 is a washing liquid enriched with micro-organisms. In municipal clarification plants, there are in the activated sludge micro-organisms which process the organic compounds to use them as nutrients. The washing liquid consists of water and activated sludge. In the newly forming activated sludge there is a natural selection process, in which the micro-organisms which process the phenol, formaldehyde and their condensation products increase while other micro-organisms, on the other hand, die off.

In order to keep the micro-organisms active, they must be kept supplied with adequate oxygen (about 1 to 3 mg/liter). A ventilation system 23 serves this purpose. It is favourable for the activated sludge to contain between 3 to 7 g dry substance per liter of washing liquid. It is also expedient to add nutrients. For the rest, the working conditions with activated sludge are known to a man skilled in the art, who can ascertain them from VDI Guidelines 3478.

It has been found effective to feed phenol to the micro-organisms because in this way they obviously become particularly active and are subsequently capable of processing even extraordinarily long molecule chains.

In the spray tower 5, the gaseous impurities entrained by the crude gas are degraded with the washing liquid (activated sludge), the others are partially washed out and discharged into the storage tank 17 through the outlet 22.

The crude gas now passes through the conduit 6 into the wet film precipitator 7, at the electrodes 24 of which the aerosols are separated and pass through a discharge line 25 likewise into the storage tank 17. In the storage tank 17, therefore, the micro-organisms break down the impurities discharged both from the spray tower 5 and also from the wet film precipitator 7.

Disposed in the discharge line 25 is a three-way valve 26 by which the washing liquid can optionally be passed into the collecting tank 11 instead of into the storage tank 17. This measure makes it possible also to carry out the precleaning in the pre-washer 3 at least partially with washing liquid.

The clean gas leaving the wet film precipitator 7 is substantially cleaner than gas cleaned by previous methods or using earlier apparatuses and above all contains virtually no odorous or coloured substances which might otherwise arouse the impression of inadequate waste gas purification or lead to annoyance of the population.

Since the crude gas still contains active binder particles and constituents, these could harden out on the electrodes 24 of the wet film precipitator 7 and thus reduce the efficiency of separation. The micro-organisms which encounter the electrodes 24 do however form a lawn of film which prevents the binder hardening out. Certainly, it is expedient regularly to clean the electrodes 24, achieving this object simply by rinsing them with the washing liquid.

From a fresh water source W, respective conduits 27, 28 comprising check valves 29, 30 lead to storage tank 17 or collecting tank 11.

Since by increasing the micro-organisms, nutrients and fresh water addition, the volume of washing liquid in the storage tank 17 increases, the storage tank has an overflow 31 by which it is connected to a secondary clarification tank 32 in which excess activated sludge is deposited and extracted through an outlet 33; this part of the activated sludge can be exploited or deposited elsewhere. The biologically purified water which can be drawn from the secondary clarification tank 32 is passed by a pump 34 and a branch pipe 35 into the collecting tank 11 from which—as previously mentioned—water is taken for use in the production plant 1. As indicated by broken lines, this water can also be fed directly to the production plant 1. The biologically cleaned water can also be used for rinsing the electrodes 24 of the wet film precipitator 7.

Therefore, the invention provides a method of cleaning crude gas by which the emission levels can be considerably reduced and by which it is possible to achieve a practically odorless and colourless clean gas. Furthermore, the invention provides an apparatus for carrying out this method and which can be operated with low pressure losses and contamination as well as easy cleaning possibilities. Since the activated sludge adjusts itself to the particular contamination involved, the invention is not limited to the crude gas described. It can, for example, also be used in foundry plants or in the chipboard industry.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of cleaning crude gas, contaminated by phenol and/or formaldehyde and/or the products of condensation thereof, comprising spraying the crude gas with a circulated washing liquid enriched with micro-organisms, some of the impurities contained in the crude gas being thereby agglutinated, the washing liquid being collected and the impurities contained therein being at least partly degraded by the micro-organisms, the micro-organisms being subjected to an activation process, thereafter passing the crude gas sprayed with washing liquid through an electric high-voltage field thereby collecting micro-organisms and aerosol particles entrapped in said crude gas, sprayed with washing liquid on electrodes producing said high-voltage field.

2. Method of claim 1, wherein a part of the washing liquid is separated, cleaned and used for pre-cleaning or the crude gas.

3. Method according to claim 1 wherein phenol is added to the washing liquid at predetermined times.

* * * * *